United States Patent [19]

Ritchie

[11] Patent Number: 4,940,287
[45] Date of Patent: Jul. 10, 1990

[54] LOAD ENHANCER FOR DUMP TRUCKS

[75] Inventor: John P. Ritchie, Wichita, Kans.

[73] Assignee: Proc Products, Inc., Wichita, Kans.

[21] Appl. No.: 370,841

[22] Filed: Jun. 23, 1989

[51] Int. Cl.$^5$ .............................................. B62D 61/10
[52] U.S. Cl. ................................. 298/23 R; 298/1 R; 180/24.02; 280/81.1
[58] Field of Search ............... 298/22 AE, 22 P, 23 R, 298/1 R, 23 S, 23 A; 180/24.02; 280/81.1, 704

[56] References Cited

U.S. PATENT DOCUMENTS

| | | |
|---|---|---|
| 3,112,100 | 11/1963 | Prichard . |
| 3,191,961 | 6/1965 | Brennan et al. . |
| 3,271,077 | 9/1966 | Timmer et al. ................. 280/81.1 X |
| 3,371,543 | 3/1968 | Jackson et al. . |
| 3,838,885 | 10/1974 | Brennan et al. ................. 280/81.1 X |
| 3,895,818 | 7/1975 | Fearon ................. 280/81.1 |
| 4,063,779 | 12/1977 | Martin et al. ....................... 298/22 P |

Primary Examiner—Robert J. Spar
Assistant Examiner—William M. Hienz
Attorney, Agent, or Firm—Kokjer, Kircher, Bradley, Wharton, Bowman & Johnson

[57] ABSTRACT

Apparatus which enhances the load carrying capacity of a dump truck without interfering with dumping of the dump bed. A rigid frame which is added to the back end of the truck includes a beam carrying an axle and a pair of wheels. A hydraulic cylinder pivots the beam between a load bearings position in which the wheels travel on the roadway to bear part of the dump bed load and a raised position in which the beam extends vertically between a pair of side by side tail gates. A hinged door operates in the space between the two tail gates to prevent spillage of the load through the space while accommodating extension of the beam through the space when the dump bed is raised to dump its load. A diverter in the dump bed deflects material away from the space and toward the tail gate openings.

20 Claims, 3 Drawing Sheets

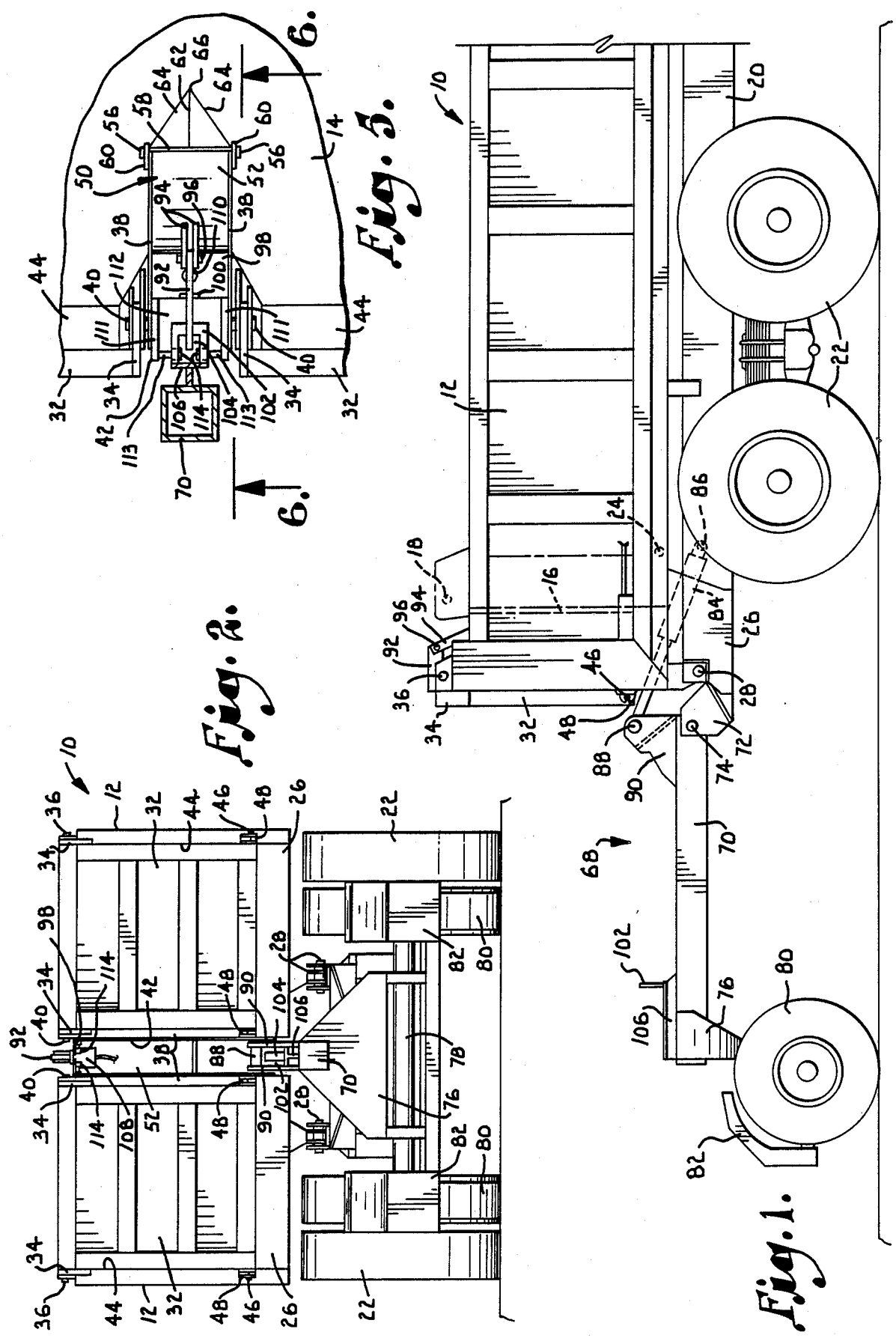

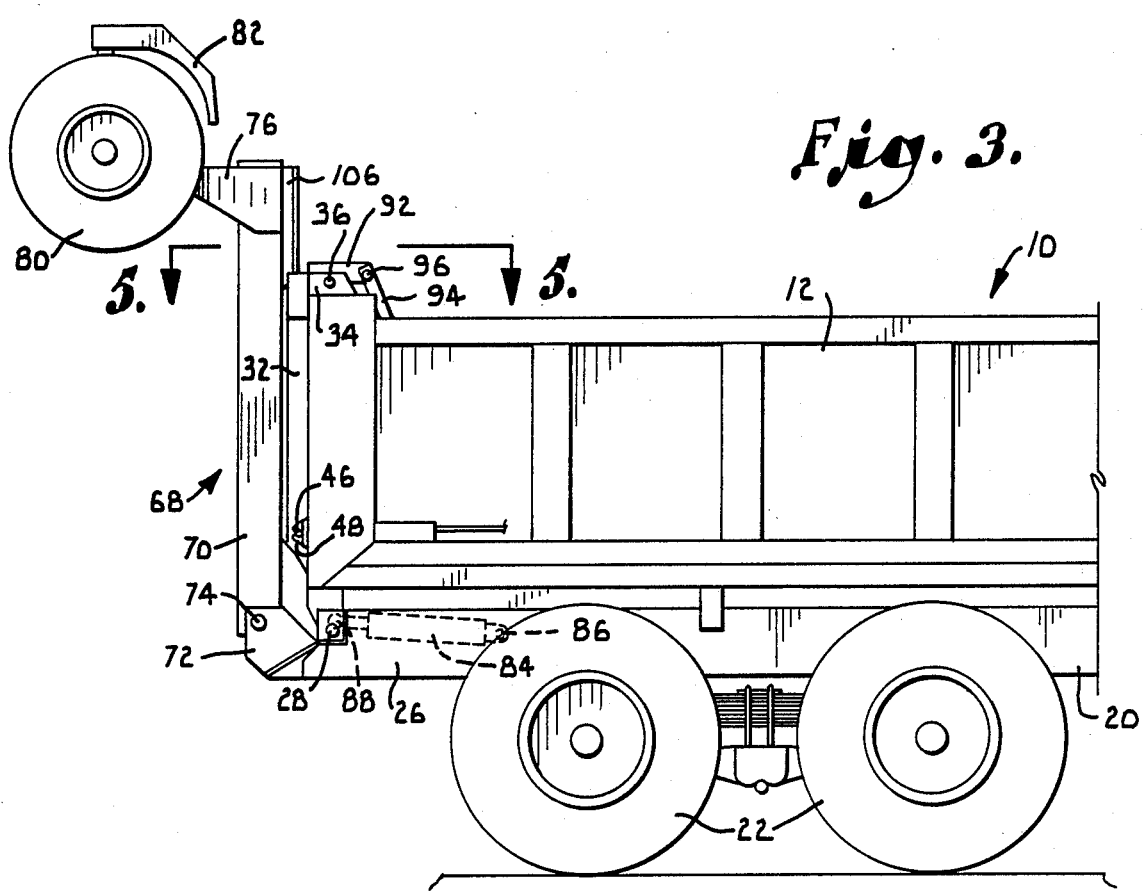
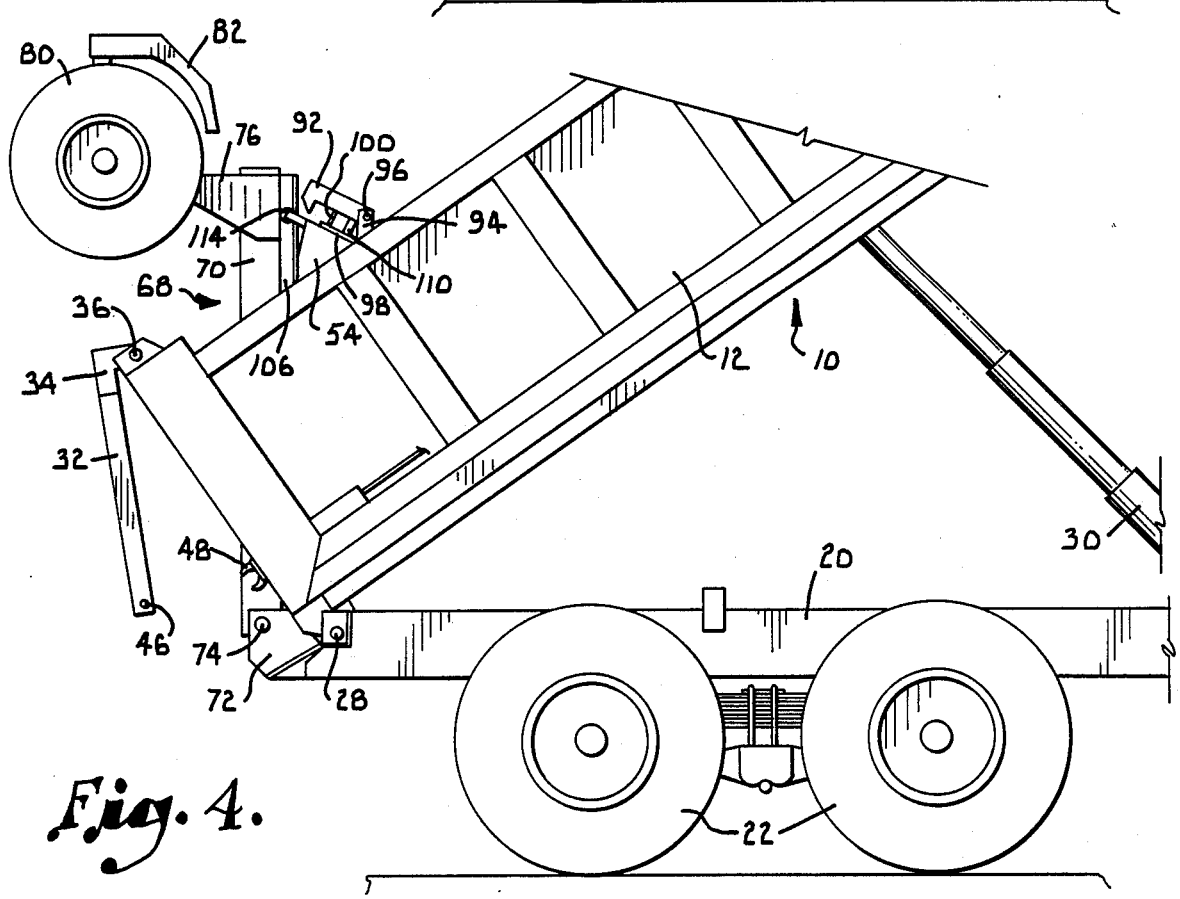

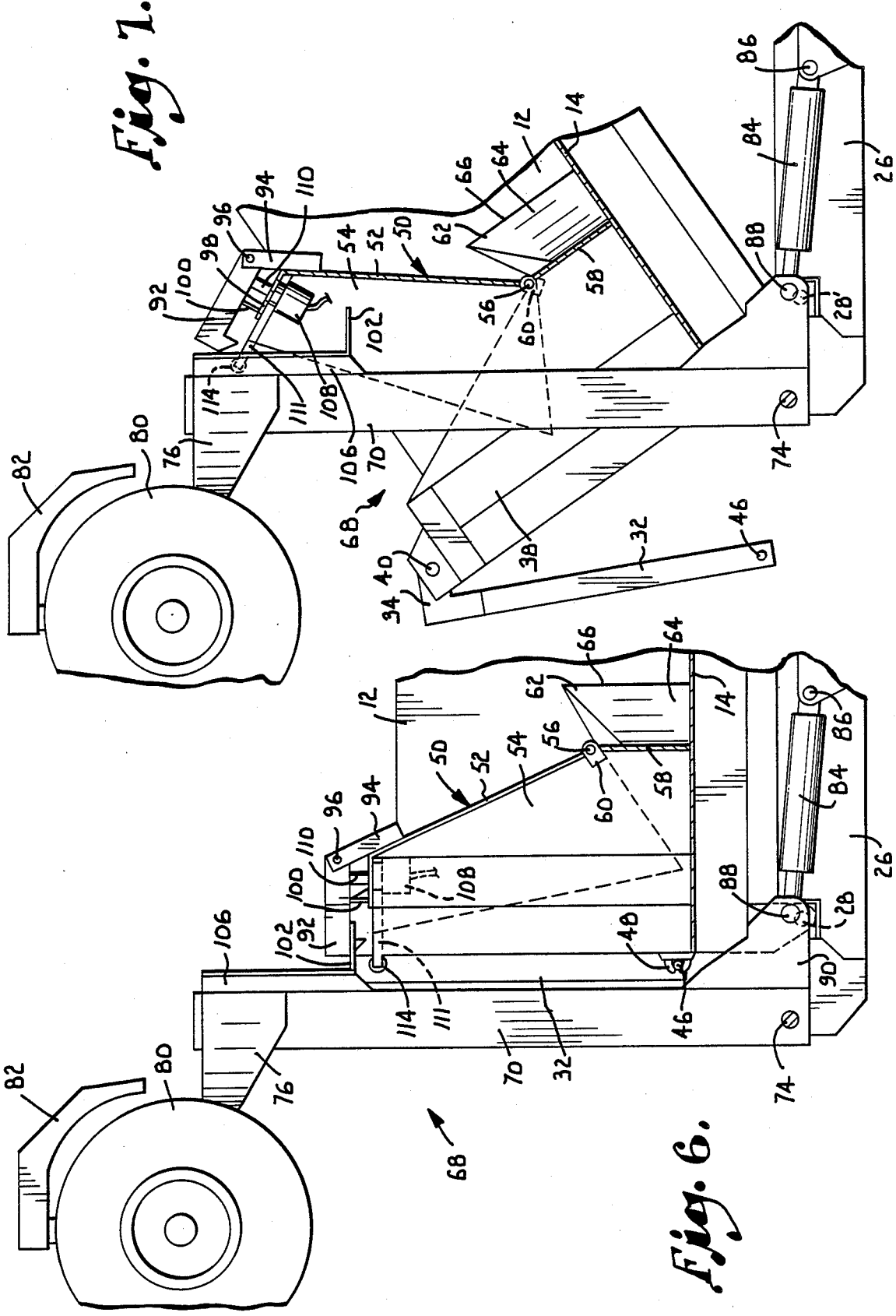

LOAD ENHANCER FOR DUMP TRUCKS

BACKGROUND OF THE INVENTION

This invention relates in general to dump trucks and more particularly to a load enhancer which allows a dump truck to carry a heavier load than normal without interfering with the ability of the dump truck to dump its load.

Load enhancing arrangements have been developed for use with concrete trucks and other types of trucks in order to allow the truck to be loaded more heavily than usual, as shown in U.S. Pat. No. 3,112,100 to Prichard and U.S. Pat. No. 3,191,961 to Brennan et al, for example. This type of apparatus includes an added frame which is mounted on the back end of the vehicle and which may be lowered to bring its wheels onto the roadway so that the added frame bears part of the load of the vehicle, thus distributing the load over an additional axle and allowing the vehicle to carry a heavier load than it legally or safely could without the additional axle. When the added frame is not needed to bear part of the vehicle load, it may be pivoted upwardly and stored. In the stored position of the added frame, the overall length of the vehicle is not increased significantly and its maneuverability is not restricted appreciably.

Despite the recognized advantages of load enhancing equipment of this type, it has not in the past been applicable to dump trucks. The added frame members are located behind the vehicle where they would interfere in an unacceptable way with the ability of the truck to dump its contents. Because of this, it has not been thought to be feasible to apply load enhancing equipment to a dump truck, and dump trucks have not been able to take advantage of the increased load carrying capacity that such equipment offers.

SUMMARY OF THE INVENTION

Contrary to what the prevalent opinion has been in the industry, I have found that a dump truck can be equipped with a load enhancing structure which adds to its load bearing ability without interfering with dumping operations. In accordance with the present invention, load enhancing equipment is installed on a dump truck in order to make available an additional load bearing axle at the rear of the truck while at the same time allowing the truck to unload its contents without significant interference from the added equipment. Thus, the capacity of the dump truck is increased substantially without detracting from its dumping function.

This improvement is made possible by constructing the added load bearing frame in a special manner and modifying the back end of the dump bed to accommodate the added frame. The frame includes a rigid beam which may be pivoted up and down by a hydraulic cylinder to raise and lower an added axle which carries wheels. The conventional tailgate of the dump truck is modified to provide a pair of side by side gates which are spaced apart far enough to allow the beam to pass between them. As a result of this construction, the dump bed may be raised and the beam can fit between the two tailgates during dumping operations, allowing the contents of the dump bed to be discharged through the tailgate openings on the opposite sides of the beam.

In order to prevent material in the truck bed from spilling out between the two tailgates, a special hinged door is provided in the space between the gates. The door can be deflected forwardly by the beam to allow the beam to extend into the bed as necessary when the dump bed is raised. Cooperating with the hinged door is a material diverter which deflects the material in the bed on opposite sides of the beam so that the load of the dump bed is discharged through the two tailgate openings.

In this manner, the added load bearing frame provides a dump truck with an additional axle which can be used whenever necessary. Therefore, the dump bed can be safely and legally loaded beyond its capacity in the absence of the added frame. Preferably, the dump bed is extended slightly to the rear in order to provide it with additional volume. As an additional safety feature, a latching arrangement is provided to latch the beam in place in its raised position so that it cannot inadvertently drop downwardly in the event of a malfunction in the hydraulic system.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary side elevational view of a dump truck equipped with a load enhancer constructed according to a preferred embodiment of the present invention, with the dump bed lowered to its transit position and the load enhancer in its load bearing position to carry part of the load of the vehicle;

FIG. 2 is a rear elevational view of the dump truck and load enhancer shown in FIG. 1;

FIG. 3 is fragmentary side elevational view similar to FIG. 1, but showing the load enhancer frame raised and latched in its raised storage position;

FIG. 4 is a fragmentary side elevational view similar to FIGS. 2 and 3, but showing the dump bed raised to dump its contents while the frame of the load enhancer is held in its storage position;

FIG. 5 is a fragmentary sectional view on an enlarged scale taken generally along line 5—5 of FIG. 3 in the direction of the arrows;

FIG. 6 is a fragmentary sectional view taken generally along line 6—6 of FIG. 5 in the direction of the arrows; and FIG. 7 is a fragmentary sectional view similar to FIG. 6, but showing the dump bed raised to unload its contents.

DETAILED DESCRIPTION OF THE INVENTION

Referring now to the drawings in more detail, numeral 10 generally designates the dump bed of a dump truck which may be a conventional engine driven dump truck having an operator's cab (not shown) at the front. The dump bed 10 is generally rectangular and includes parallel opposite sides 12 and a horizontal floor 14 (see FIG. 2) which carries the load deposited in the dump bed.

In accordance with the present invention, the dump bed 10 is a modification of a conventional dump bed which, as illustrated in phantom lines in FIG. 1, includes a conventional tail gate 16 hinged to open and close about a horizontal hinge axis 18. The conventional dump bed is mounted on a rigid truck frame 20 which travels on wheels 22. The conventional dump bed is mounted to pivot up and down about a horizontal dump axis 24.

In accordance with the present invention, the frame 20 is extended to the rear by rigidly connecting additional frame members 26 to the back end of frame 20 and by similarly extending the sides 12 and floor 14 to the rear. Aligned horizontal pins 28 connect the dump bed 10 to the frame 20 for pivotal movement up and down about the horizontal axis provided by the pins 28. A hydraulic cylinder 30 may be extended to raise the dump bed 10 about pins 28 to the raised or dumping position shown in FIG. 4, and the cylinder 30 may be retracted to lower the dump bed onto the frame 20 to the normal transit position of the bed.

In accordance with present invention, the conventional tail gate 16 is replaced by a pair of tail gates 32 which are mounted on the back end of the extended dump bed 10. As best shown in FIG. 2, the gates 32 are mounted side by side but are spaced apart. The upper end of each gate 32 is provided on its opposite sides with mounting brackets 34. The outside bracket 34 of each gate is pivotally pinned to the corresponding side 12 of the dump bed by a horizontal pivot pin 36. A pair of vertical plates 38 are mounted to the truck bed 10 adjacent to the inside edges of the gates 32. The inside bracket 34 of each door 32 is pivotally pinned to the corresponding plate 38 by a horizontal pivot pin 40. The pins 36 and 40 are aligned with one another to establish a common horizontal pivot axis about which the gates 32 can pivot between open and closed positions.

The two plates 38 are spaced apart to provide a space or gap 42 between the gates 32. Between each dump bed side 12 and the corresponding plate 38, a tail gate opening 44 is provided in the back of the dump bed, and it is noted that the two tail gate openings 44 are located on opposite sides of the central gap 42. The tail gates 32 close the corresponding tail gate openings 44 when the tail gates are closed. Conversely, the tail gate openings 44 are exposed so that material in the dump bed can be discharged through them when the gates 32 are open, as shown in FIGS. 4 and 7.

The bottom end of each gate 32 is provided with a pair of pins 46 which each may be captured by sets of latching jaws 48 in order to latch the tail gates in their closed positions. The jaws 48 may be opened to release the latching pins 46, thus allowing the tail gates to swing open about the axis of the pins 36 and 40.

A hinged door which is generally identified by numeral 50 operates in the gap 42 and acts to close the gap 42 so that material in the dump bed cannot inadvertently spill through it. The door 50 is generally U shaped in section and includes a flat front panel 52 and parallel sides 54 which extend forwardly from panel 52, as best shown in FIGS. 6 and 7. The door 50 is pivotally mounted in the truck bed 10 for movement between the rearward position shown in FIG. 6 and the forward position shown in FIG. 7. A pair of horizontal pivot pins 56 connect the door 50 between the two plates 38. A connecting plate 58 connects plates 38 together at the front, and a pair of ears 60 are secured to the respective plates 38 adjacent the upper edge of the plate 58. The pins 56 are extended through the ears 60 and serve to pivotally mount the door 50 for movement about the horizontal axis of the pins. The sides 54 of the door 50 are adjacent to and inwardly of the plates 38, and the door 50 thus operates in the gap 42.

Immediately to the rear of plate 58, a material diverter 62 is mounted on the floor 14 of the dump bed.

As best shown in FIG. 5, the diverter 62 is generally triangular when viewed from the top and includes opposite sides 64 which intersect at an apex 66 formed on the front end of the diverter 62. The sides 64 diverge as they extend to the rear away from the apex 66, and the sides terminate in connections with the outer edges of plate 58.

By virtue of this arrangement, material in the dump bed 10 which flows rearwardly along the floor 14 is deflected by the diverter 62 along the sides 64 and is thus directed outwardly beyond the plates 38 and on opposites sides of the gap 42. Consequently, when the dump bed is unloaded, its contents are directed solely through the tail gate openings 44 and none of the material in the truck bed is able to spill out through the gap 42 either while the truck is in transit or during dumping operations.

The back end of the dump truck is equipped with an added frame which is generally identified by numeral 68 and which is a rigid structure that serves to bear part of the load of the dump bed. The frame 68 includes a rigid box beam 70 which is pinned at its forward end between a pair of brackets 72 secured to the frame 20 of the dump bed. A horizontal pivot pin 74 connects beam 70 between the brackets 72 for pivotal movement about the axis of the pin.

At its back end, beam 70 connects with a rigid bracket 76 which carries an axle 78. On its opposite ends, the axle 78 carries a pair of wheels 80 which are preferably wheels that are castered and linked together. Wheel guards 82 are mounted behind the wheels 80.

The pivotal connection provided by the pivot pin 74 permits the frame 68 to be pivoted up and down between the raised or stored position shown in FIGS. 3-7 and the load bearing position shown in FIG. 1. In the raised position, the beam 70 extends straight upwardly above the pivot pin 74 to raise the wheels 80 and axle 78 well above the ground. In this position, the frame 68 does not add significantly to the overall length of the dump truck and it does not inhibit its maneuverability. In the load bearing position of the frame, beam 70 extends horizontally to the rear from the pivot pin 74, and the wheels 80 travel along the roadway behind the dump truck so that the frame bears part of the load of the truck.

The frame 68 is raised and lowered by a hydraulic cylinder 84 having its base end pinned at 86 to the frame 20 of the dump truck. The opposite or rod end of the cylinder is pivotally pinned at 88 between a pair of bracket plates 90 secured to the front end portion of beam 70. When the cylinder 84 is fully extended, pin 88 is located above pin 74, and the pins 74, 86 and 88 define a triangle. Consequently, a rigid arrangement is provided and the cylinder 84 maintains a downward force on the frame 68 which holds the wheels 80 in contact with the roadway to insure that the frame will bear part of the load when the dump truck is in transit. Thus, the frame 68 provides the added axle 78 and increases by one the number of axles that effectively bear the weight of the dump truck. The truck is therefore able to safely and legally carry a greater load than in the absence of the added axle 78. When the cylinder 84 is fully retracted, pin 88 orbits around pin 74, and the beam 70 is thus pivoted through an arc of 90 degrees to the raised or storage position of the frame 68.

A safety latch is provided to latch frame 68 in its raised position. The safety latch includes latch bar 92 which is connected at its forward end between a pair of bracket arms 94 secured to panel 52 of the door 50. A horizontal pivot pin 96 connects bar 92 between the bracket arms 94 and provides a pivot axis about which bar 92 may pivot up and down. Bar 92 has a hook shaped configuration to provide it with a latching head in the end opposite the pivot pin 96. The door 50 has a top plate 98 from which an upwardly projecting rest 100 extends. The latch bar 92 normally rests on the rest 100.

The latch bar 92 cooperates with a small latch plate 102 which presents a rectangular opening 104 (see FIG. 5). The latch plate 104 is carried on top of a T shaped member 106 which is in turn mounted on top of beam 70 near its back end.

When frame 68 is moved upwardly to its raised position, the latch plate 102 engages and fits beneath the hook shaped head of the latch bar 92, and the head of the latch bar is captured in the opening 106 automatically when the frame is raised. The safety latch is thus automatically acting to latch the frame 68 in the raised position each time it is raised.

The latch bar 92 may be pivoted upwardly to a release position by a pneumatic actuator 108 having a plunger 110 extending from it and against the underside of the latch bar 92. When air pressure is applied to the actuator 108, plunger 110 extends and thus pivots bar 92 upwardly about pin 96 to displace the hooked head of the latch bar from the opening 106. The safety latch is then released, and the frame 68 may be pivoted downwardly to the load bearing position upon extension of the cylinder 84.

As shown in FIG. 5, a pair of parallel arms 111 extend rearwardly beyond the top plate 98 of door 50 and present a space 112 between them. Axles 113 project toward one another from the ends of arms 111, and each axle 113 receives a roller 114 which may turn on the axle. The rollers 114 are spaced apart far enough to receive between them the tapered lower edge portion of the web of the T shaped member 106.

In use, the added frame 28 is in the load carrying position of FIG. 1 when the dump truck is in transit carrying a load. In the load bearing position, wheels 20 travel along the roadway behind the truck, and the frame 68 bears part of the load in the bed 10. The load is transmitted through the cylinder 84 and the beam 70 to the axle 78 and wheels 80. This effectively provides the dump truck with an additional axle which causes the load to be distributed over a greater number of axles so that heavier loads can be carried by the dump truck safely and in compliance with applicable regulations.

When the load carried in the dump bed 10 is to be dumped, the frame 68 is pivoted upwardly to the raised or storage position by retracting the rod of cylinder 84. When beam 70 reaches the vertical position, the latch bar 92 automatically latches with the latch plate 102, and this safety latching arrangement thereafter latches the frame 68 in the raised position. Consequently, even if the hydraulic cylinder 84 or some part of the hydraulic system should fail, frame 68 remains latched in the raised position and does not create a safety hazard.

With frame 68 in the raised position, cylinder 30 can be extended to raise the dump bed about the axis of pins 28, as shown in FIG. 4. The latching jaws 48 are separated to release the latch pins 46, and the gates 32 then open under the influence of gravity to expose the gate openings 44 such that the material in the dump bed can be discharged through the gate openings.

As the dump bed 10 is thus raised, the space 42 receives beam 70 in extension through it and the beam 70 extends progressively into the dump bed as the bed is being raised. At the same time, the beam 70 deflects door 50 forwardly about its pivot axis (pins 56) from the rearward position of FIG. 6 to the forward position of FIG. 7. The ability of the door 50 to deflect in this manner permits extension of the beam 70 through the gap 42 and into the dump bed 10. As the door 50 deflects forwardly, latch 92 is displaced from the latch plate 102, and the cut out 112 receives the latch plate 102 and allows plate 98 to move upwardly above the latch plate 102. At the same time, the web portion of the T member 106 is able to pass through the gap between rollers 114 so that the T member can enter the space 112 to allow the top plate 98 of door 50 to move in the requisite manner. The rollers 114 roll along the flanges of member 106 as raising of the bed continues.

When the dump bed 10 is raised, the material which is loaded in it flows to the rear along the floor 14. The material that encounters diverter 62 is deflected along the angled surfaces 64 on opposite sides of the diverter and on opposite sides of the plates 38 and the beam 70. This diverts the material toward the gate openings 44 and prevents it from entering the gap 42. Consequently, the material is discharged through the two gate openings 44 on opposite sides of the beam 70.

After the bed has been dumped, cylinder 30 can retracted to lower the bed about the axis of pins 28 to its normal transit position. As this occurs, the flange of T member 106 acts against the rollers 114 to pull the door or 50 to the rear, thus returning the door to the rearward position shown in FIG. 6. When the dump bed is in the fully lowered position, the hooked head of the latch bar 92 is engaged in the latch opening 104 to again securely latch frame 68 in its raised position. Normally, the jaws 48 are closed to capture pins 46 and latch gate 32 closed when the bed 10 is lowered.

It should be noted that the dump truck can be driven with the frame 68 in the raised position when the bed 10 is empty or when it is carrying only a small load and the added load bearing capacity of the frame 68 is not needed.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for distributing the load borne by a dump truck having a dump bed supported for pivotal movement about a dump axis, said apparatus comprising:
   a pair of gates on said dump bed spaced apart thereon and supported for hinged opening and closing movement to dump the load in the bed when the bed is raised about said dump axis and the gates are opened;

a rigid frame carrying a wheel assembly thereon and including a beam having a front end and a back end to which said wheel assembly is connected;

means for coupling said front end of the beam with the dump truck in a manner mounting the beam for movement about a substantially horizontal pivot axis between a load bearing position of the frame wherein said wheel assembly engages the ground and the frame bears part of the weight of the dump bed load and a raised position of the frame wherein said beam extends generally upwardly at a location between said gates to raise the wheel assembly above the ground;

power means for effecting movement of said frame between the load bearing position and the raised position; and means for diverting material in the dump bed on opposite sides of said beam and out past said gates when the dump bed is raised and the gates are opened to dump the load in the dump bed.

2. Apparatus as set forth in claim 1, including safety latch means for latching said frame in the raised position.

3. Apparatus as set forth in claim 2, including means for selectively releasing said safety latch means to permit movement of the frame to the load bearing position.

4. Apparatus as set forth in claim 1, wherein said diverting means comprises a diverter member located in the dump bed generally between said gates and arranged to direct the flow of material in the dump bed on opposite sides of said diverter member when the bed is raised.

5. Apparatus as set forth in claim 1, including door means for preventing material in the dump bed from spilling out between said gates, said door means being arranged to accommodate extension of said beam into the dump bed between said gates when the dump bed is raised about said dump axis with said frame in the raised position thereof.

6. Apparatus as set forth in claim 5, wherein said door means comprises a door mounted in the dump bed generally between said gates at a location to block spillage of material in the bed between the gates.

7. Apparatus as set forth in claim 6, including means for mounting said door in the dump bed for pivotal movement therein between a rearward position when the dump bed is lowered and a forward position wherein the door is deflected forwardly by the frame in response to extension of the beam between said gates when the dump bed is raised with the frame in its raised position.

8. Apparatus as set forth in claim 7, wherein said door includes opposite sides between which said beam is received in the forward position of the door.

9. Apparatus as set forth in claim 7, including means for pulling said door rearwardly to the rearward position from the forward position when the dump bed is lowered.

10. Apparatus as set forth in claim 7, including safety latch means for latching said frame in the raised position, said latch means comprising cooperating latch elements on said door and said frame.

11. In a dump truck having a load carrying dump bed mounted to pivot up and down about a dump axis and having a back end through which the dump bed load may be dumped when the bed is raised, the improvement comprising:

a pair of gates located side by side on the back end of the dump bed but spaced apart to present a gap therebetween, said gates being mounted on the dump bed for hinged movement between an open position wherein gate openings in the back end of the dump bed are exposed by the respective gates for dumping of the load therethrough and a closed position wherein the gate openings are closed;

a rigid beam having front and back ends;

an axle carrying a pair of wheels thereon adapted to bear part of the load of the dump bed, said axle being mounted on the back end of said beam;

means for connecting said front end of the beam with the dump truck in a manner permitting the beam to pivot about a substantially horizontal pivot axis between a raised position wherein said beam extends upwardly from said pivot axis between said gates to raise said axle and wheels above the ground and a load bearing position wherein said wheels travel along the ground and bear part of the dump bed load;

power means for moving the beam between said raised position and said load bearing position;

door means in said gap for closing the gap, said door means being arranged to permit extension of the beam through the gap when the dump bed is raised with the beam in the raised position; and means for diverting material in the bed on opposite sides of said gap and through the gate openings when the dump bed is raised and the gates are in the open position.

12. The improvement of claim 11, wherein said door means comprises a door mounted in the dump bed in said gap for pivotal movement therein, said door being pivotally deflected by said beam when the beam extends through said gap in the raised position of the dump bed.

13. The improvement of claim 12, wherein said door comprises a panel and opposite sides extending from said panel, said beam being received between said opposite sides of the door when the beam extends through said gap in the raised position of the dump bed.

14. The improvement of claim 12, including safety latch means on said door for latching the beam in its raised position.

15. The improvement of claim 11, wherein said diverting means comprises a diverter mounted in the dump bed and having opposite sides for deflecting material in the bed away from said gap and toward the gate openings.

16. The improvement of claim 11, including safety latch means for latching said beam in the raised position.

17. A dump truck comprising:

a wheel mounted truck frame;

a dump bed adapted to carry a load and having a back end through which the load may be dumped, said dump bed being mounted on the truck frame in a manner permitting the dump bed to be raised to a dumping position;

means operable to raise the dump bed to the raised position;

a pair of gates spaced apart on the back end of said dump bed and mounted thereon for opening and closing movement to respectively open and close said back end, said gates acting to expose a pair of gate openings on said back end when open and to close said gate openings when closed;

a rigid beam carrying an axle and a pair of wheels on the axle, said beam being mounted on the truck frame for movement about a substantially horizontal pivot axis between a raised position wherein the beam extends generally upwardly from said pivot axis to raise the axle and wheels above the ground and a load bearing position wherein the beam extends rearwardly from said pivot axis with the wheels engaging the ground to bear part of the dump bed load;

power means for effecting movement of said beam between the raised and load bearing positions; and door means on said dump bed for preventing material in the bed from spilling between the gates, said door means being arranged to accommodate extension of the beam between said gates into the bed when the bed is raised to the dumping position with said beam in the raised position.

18. The dump truck of claim 17, including means in the dump bed for diverting material therein on opposite sides of the beam and toward the gate openings when the beam is in the raised position and the dump bed is raised to the dumping position to discharge the load therefrom.

19. The dump truck of claim 17, wherein said door means comprises a door mounted in the dump bed generally between said gates in a manner to be deflected by the beam to accommodate extension of the beam between the gates.

20. The dump truck of claim 17, including safety latch means operable automatically upon movement of said beam to the raised position to latch the beam therein, said latch means being selectively releaseable to allow the beam to be moved to the load bearing position.

* * * * *